US007823265B2

(12) United States Patent
Matzner et al.

(10) Patent No.: US 7,823,265 B2
(45) Date of Patent: Nov. 2, 2010

(54) FLOWLINE TORQUE ARM ASSEMBLY

(75) Inventors: Mark D. Matzner, Burleson, TX (US); Jonathan D. Curlett, Haltom City, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 1297 days.

(21) Appl. No.: 11/354,663

(22) Filed: Feb. 15, 2006

(65) Prior Publication Data
US 2006/0181081 A1 Aug. 17, 2006

Related U.S. Application Data

(60) Provisional application No. 60/653,014, filed on Feb. 15, 2005.

(51) Int. Cl.
*B23Q 3/00* (2006.01)
*F16L 23/00* (2006.01)
(52) U.S. Cl. .......................................... 29/468; 285/364
(58) Field of Classification Search .................. 29/468, 29/464, 428, 237, 267, 280, 272, 271, 244; 285/364, 242, 259, 24, 39
See application file for complete search history.

(56) References Cited

U.S. PATENT DOCUMENTS 3,571,896 A * 3/1971 Wilkerson .................... 29/237

* cited by examiner

*Primary Examiner*—John C Hong
(74) *Attorney, Agent, or Firm*—Bracewell & Giuliani LLP

(57) ABSTRACT

An assembly for moving a pair of flowline members relative to each other has a pair of flowline collars that are adapted to connect to an end portion of one of the pair of flowline members. The assembly has an arm member with an end portion rotationally mounted to one of the flowline collars and a connecting member pivotally mounted to the other flowline collar. The connecting member is pivotally mounted to the arm member a distance away from the end portion of the arm member that is connected to the flowline collar, so that rotational movement of the arm member moves the flowline members relative to each other. The assembly can also have an incremental distance adjustor assembly which maintains an incremental change in the distance between the pair of flowline collars during a rotational movement of the arm member.

15 Claims, 5 Drawing Sheets

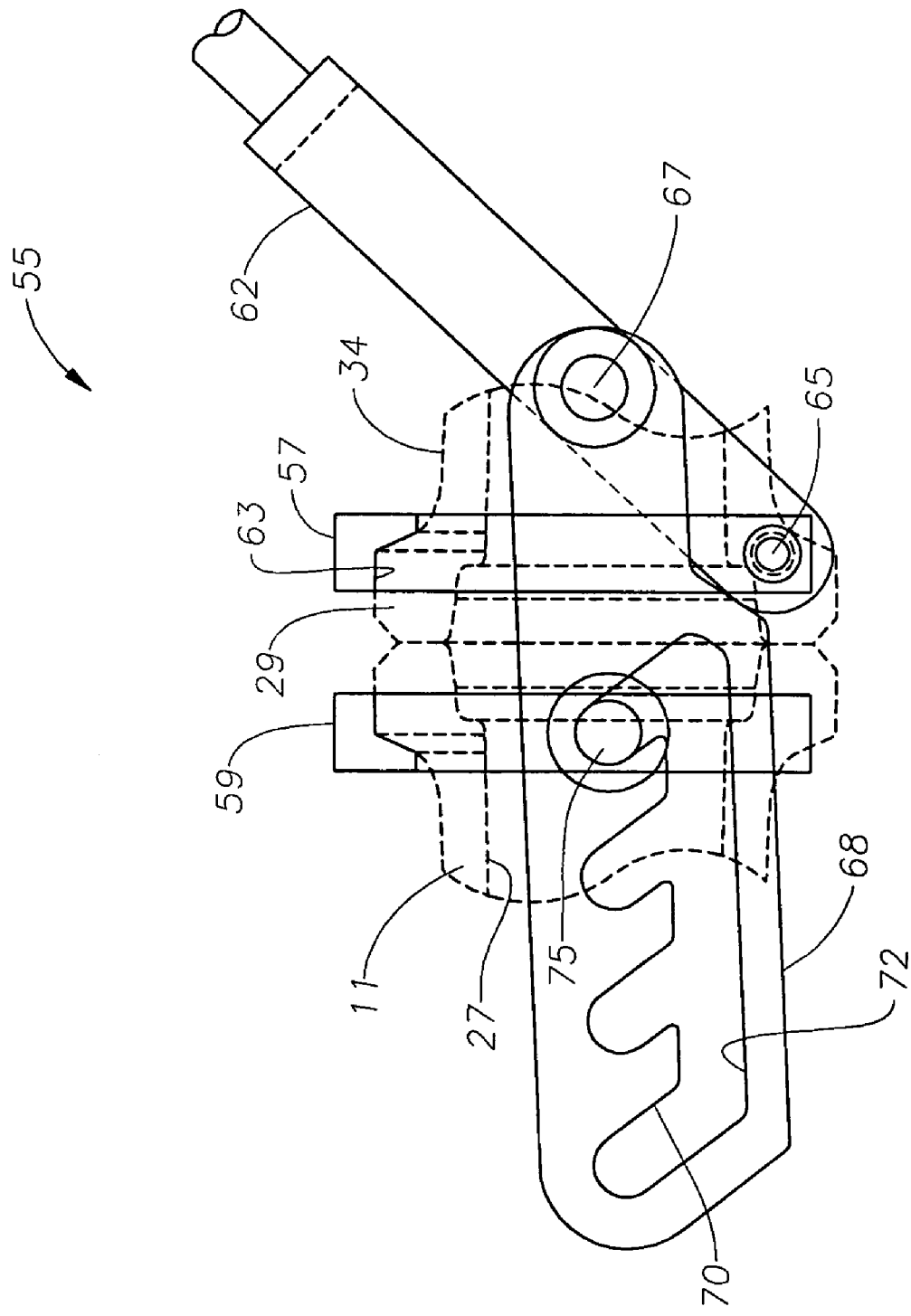

FLOWLINE TORQUE ARM ASSEMBLY

RELATED APPLICATIONS

This nonprovisional patent application claims the benefit of co-pending, provisional patent application U.S. Ser. No. 60/653,014, filed on Feb. 15, 2005, which is hereby incorporated by reference in its entirety.

BACKGROUND OF THE INVENTION

1. Field of the Invention

The present invention relates generally to oilfield pipe connectors, and in particular to a torque arm assembly for connecting flowlines in well service operations.

2. Background of the Invention

In some oilfield service operations, such as hydraulic fracturing, cementing, and acidizing, high pressure fluids are pumped down the well. In some cases, the fluid pressures may be in excess of 15,000 psi. Typically, an operator brings high pressure pumping equipment to the well site and installs temporary service flowlines from the high pressure pumps to the wellhead. Because high volumes of fluid may also be needed, a number of pumping units may be connected together at one well site.

The temporary flowline components include joint applicators or sections of steel pipe of differing lengths, various junctions, valves, and swivels. Generally, the workers have to arrange the flowlines to extend around and past a variety of well site equipment. Many connections have to be made, and each connection must be able to withstand the high pressure.

In order to connect flowline components, it is necessary to pull sections of flowlines together before securing the flowline components. In the prior art, pulling is typically done by hand. The components can be quite heavy.

SUMMARY OF THE INVENTION

An assembly for moving a pair of flowline members relative to each other includes a pair of flowline collars. Each of the flowline collars are adapted to connect to an end portion of one of the pair of flowline members that are to be moved relative to each other. The assembly also includes an arm member having an end portion rotationally mounted to one of the flowline collars and a connecting member pivotally mounted to the other flowline collar. The connecting member is pivotally mounted to the arm member a distance away from the end portion of the arm member that is connected to the flowline collar, so that rotational movement of the arm member moves the flowline members relative to each other.

Each of the pair of flowline collars can have an arcuate opening to receive the end portion of the flowline members. Each of the flowline collars can also have a first inner surface defining a first diameter and a second inner surface defining a second inner diameter. The first inner diameter is larger than the second inner diameter.

The flowline collar to which the arm member is rotationally mounted can also have an arm collar pin about which the arm member rotates. The flowline collar to which the connecting member is pivotally connected can also have a connecting member collar pin extending though the connecting member. Moreover, the connecting member can also have an arm and connecting member pin about which the connecting member pivots relative to the arm member.

The assembly can also have an incremental distance adjustor assembly. The incremental distance adjustor maintains an incremental change in the distance between the pair of flowline collars during a rotational movement of the arm member.

The assembly can also have a support assembly to support the flowline members. The support assembly has a support base assembly and an upper assembly. The upper assembly can have a pair of upwardly extending support arms that extend at an angle from the support base assembly.

An assembly for moving a pair of flowline members relative to each other can alternatively include a pair of flowline collars. Each of the flowline collars being adapted to connect to an end portion of one of the pair of flowline members. The assembly also includes an arm member with an end portion rotationally mounted to one of the flowline collars, and a connecting member being pivotally mounted to the other flowline collar. The connecting member is pivotally mounted to the arm member a predetermined distance away from the end portion of the arm member so that rotational movement of the arm member in a first direction moves the flowline members relative to each other. The assembly also has an incremental distance adjustor assembly that maintains an incremental change in the distance between the pair of flowline collars during a rotational movement of the arm member in a second direction that is opposite from the first direction.

Each of the flowline collars can have a first inner surface defining a first diameter, and a second inner surface defining a second inner diameter. The first inner diameter is larger than the second inner diameter. An inclined surface extends between the first and second inner surfaces. The inclined surface engages an outer periphery of the end portion of the flowline member.

The incremental distance adjustor assembly can also have an axial slot that receives a portion of the flowline collar to which the connecting member is connected when the arm member rotates in the second direction. The flowline collar to which the connecting member is pivotally connected can also have a connecting member collar pin. The connecting member collar pin engages the axial slot when the arm member rotates in the second direction. The incremental distance adjustor assembly can also have a plurality of spaced-apart transverse legs in communication with the axial slot. One of the transverse legs receives the connecting member collar pin when the arm member rotates in the first direction. Each of the transverse legs can also be inclined. The inclination of each of the transverse legs can be inclined so as to engage and pull on the connecting member pin when the arm member rotates in the first direction, and to release the connecting member pin to the axial slot when the arm member rotates in the second direction.

A method of moving a pair of flowline members relative to each other includes the step of providing a pair of flowline members with end portions that are spaced-apart. Then, a flowline collar is connected to each of the pair of flowline members, at their respective end portion. An end portion of an arm member is then rotationally mounted to one of the flowline collars, and a connecting member is pivotally mounted to the other flowline collar. The connecting member is pivotally mounted to the arm member at a predetermined distance away from the end portion of the arm member. The arm member is rotated, thereby moving the flowline members relative to each other.

The method can also include positioning an incremental distance adjustor assembly between the flowline collars, and then maintaining a distance between the flowline collars during a rotational movement of the arm member in a direction opposite from the previous rotational direction of the arm member.

BRIEF DESCRIPTION OF THE DRAWINGS

FIG. 4 is a sectional view of the torque arm assembly of FIG. 3 when the sections of pipe are joined together.

DETAILED DESCRIPTION OF THE PREFERRED EMBODIMENT

Although the following detailed description contains many specific details for purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations thereon, the claimed invention.

Figure 1:
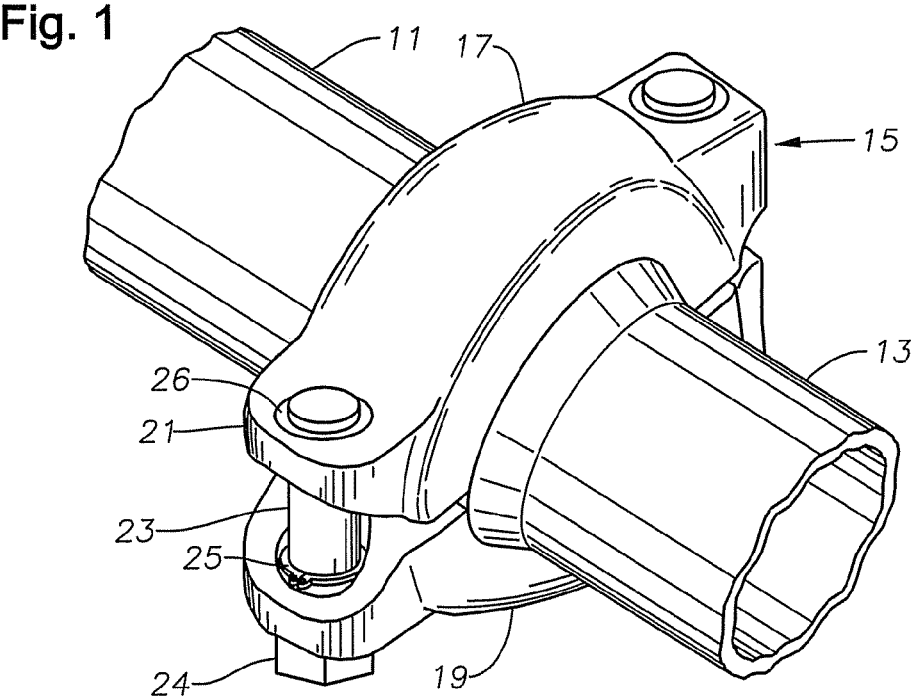
FIG. 1 is a perspective view illustrating two sections of pipe and a flowline connector.

Referring to FIG. 1, two tubular members 11 are shown connected together by a connector 15. Tubular members 11 are conduits that are utilized in oil and gas well service operations. In typical well service operations, the operator brings high capacity pumps to a well site to pump well fluids into the well for various purposes, such as cementing, fracing, and acidizing. A number of tubular members 11 are connected to each other to form temporary flowlines from the pumping equipment to the well. Tubular members 11 may comprise lengths of straight pipe, tees, ells, adapters, valve ends, and other suitable tubular structures. The lengths of straight pipe typically range from a few feet to 20 feet, and inner diameters usually are from 2 inches to 4 inches. Connectors 15 allow tubular members 11 to be quickly made up and disassembled. Tubular members 11 must be able to sustain high pressures, in some cases 15,000 psi to 20,000 psi.

Connector 15 is an assembly having two halves or semicircular connector portions 17, 19. Each connector portion 17, 19 has a lug 21 protruding from opposite sides, each lug 21 having a single hole 26. Preferably, holes 26 in lugs 21 in connector portion 17 are threaded, while holes 26 in connector portion 19 are not threaded. A fastener, such as a bolt 23, inserts through hole 26 in each lug 21 of connector portion 19 and engages the threaded holes 26 in lugs 21 of connector portion 17 to connect tubular members 11 together. Bolts 23 have heads 24 that have drive surfaces for engagement by a tool, such as a socket of an air impact wrench. Preferably bolts 23 are retained with connector portion 19 by retention devices, such as a retainer ring 25, such that when detached from connector portion 17, each bolt 23 is loosely retained with connector portion 19. Alternately, though not preferred, one bolt 23 could be retained with connector portion 17 and the other with connector portion 19. Other fasteners are feasible, such as bolts that are engaged by nuts.

Figure 2:
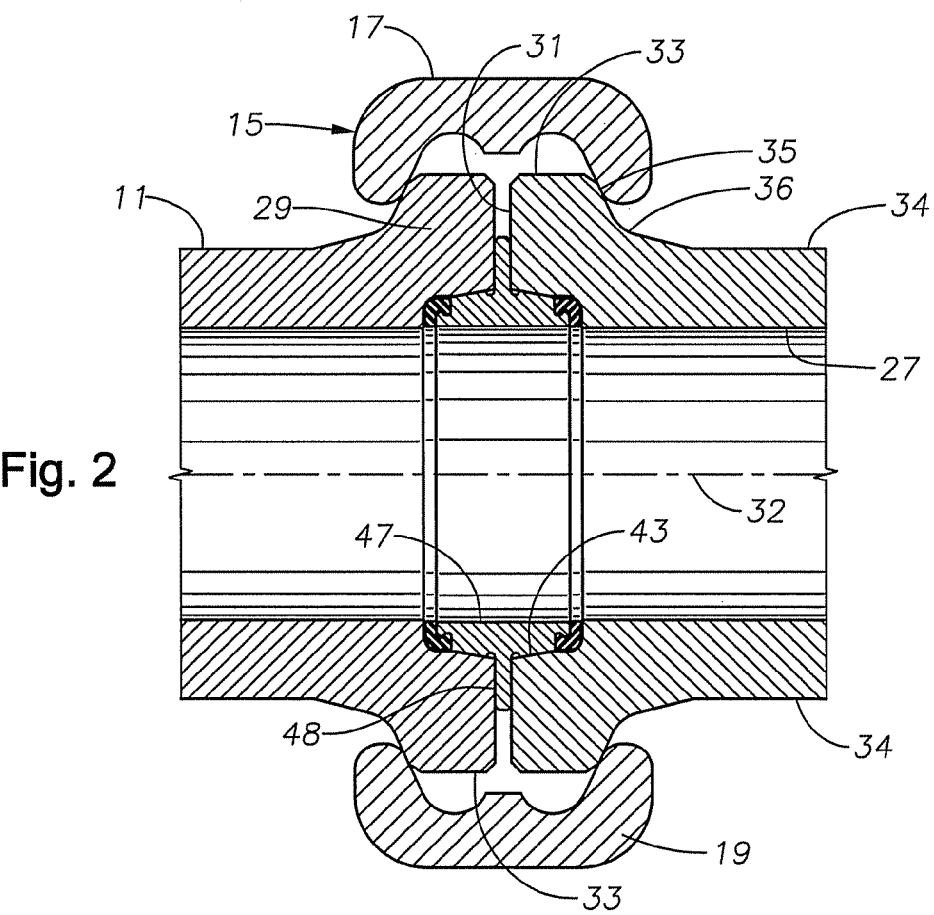
FIG. 2 is a sectional view of the sections of pipe and the flowline connector of FIG. 1.

Referring to FIG. 2, each tubular member 11 has a bore 27 that is coaxial with the bore of the tubular member to which it is connected. Each tubular member 11 also has an end with an external annular flange 29. Tubular member 11 has a flat end face 31 that is substantially perpendicular to longitudinal axis 32 of each tubular member 11. One end of flange 29 extends radially outward from end face 31. Faces 31 of the adjacent tubular members 11 are typically closely spaced but not contacting each other. Flange 29 has a cylindrical outer periphery 33 that is larger in diameter than outer periphery 34 of each tubular member 11. Flange 29 has a tapered shoulder 35 that extends from outer diameter portion 33 of flange 29 at a selected acute angle, for example about 25 degrees, relative to a plane perpendicular to axis 32. Shoulder 35 is a flat conical cam surface that appears substantially straight when seen in cross-section. Shoulder 35 joins a curved section 36 that gradually blends to the outer diameter portion 34 of tubular member 11. The bore 27 has a counterbore or recess 43 formed at the intersection with end face 31. A metal seal ring 47 locates within recesses 43 of two abutting tubular members 11. Seal ring 47 has two legs 48, one of which locates in each of the adjoining recesses 43.

In utilizing such connectors 15 and other connecting devices, it is necessary to pull the tubular members 11 together closely and join the tubular members 11 in a coaxial relationship so that the connector portions 17, 19 of the connector 15 can securely lock onto the flanges 29. FIGS. 3-9 show an embodiment of a torque arm assembly 55 and tray system 80 for moving two sections of tubular members 11 relative to each other.

Figure 3:
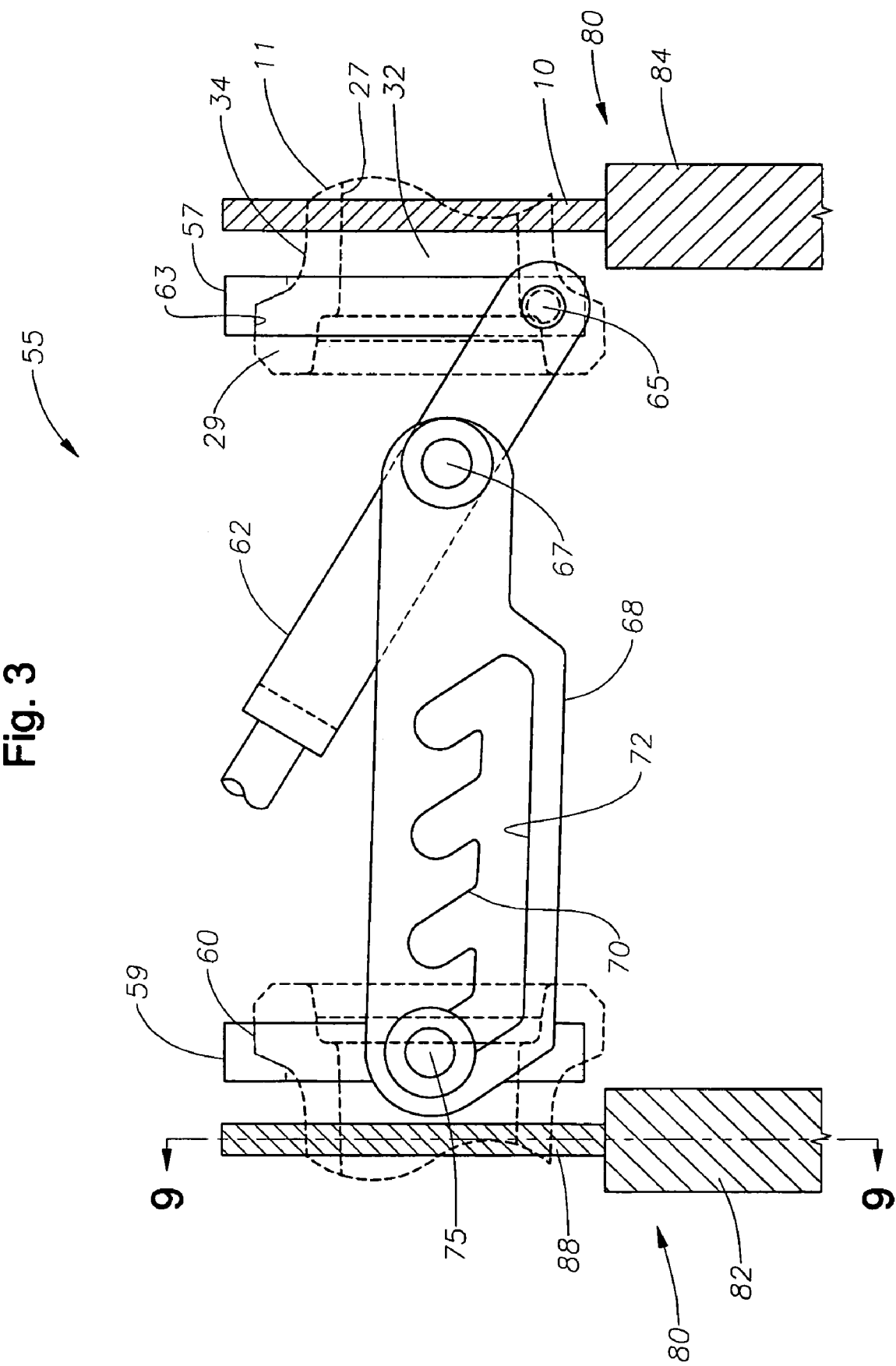
FIG. 3 is a sectional view of a flowline torque arm assembly and tray system in accordance with the invention when the sections of pipe are apart from each other.

Referring to FIG. 3, tubular members 11 are shown in a position apart from each other, and shown in a position close together in FIG. 4. A first collar 57 is hingeably connected on both lower ends by a pair of pins 65 or other suitable parts to a bottom end of the lever arm 62. An arm member or lever arm 62 is in the form of a U-shaped handle that extends from an upper center portion of lever arm 62. An end portion of a connector member, or ratchet links 68 is hingeably connected by a pair of pins 67 or other suitable parts to a fulcrum portion of the lever arm 62, so that when lever arm 62 is moved in either direction, a torque is applied to ratchet links 68 relative to the first collar 57. The torque applied to ratchet links 68 causes pins 67 of ratchet links 68 to rotate in an angular direction about the pins 65 of first collar 57. The rotation of pins 67 of ratchet links 68 about pins 65 of first collar 57 causes ratchet links 68 to move in a direction either toward or away from first collar 57.

In the preferred embodiment, ratchet links 68 include an incremental distance adjustor assembly with an axial slot or pathway 72, and a number of legs, grooves, recesses, or notches 70 at selected intervals along the pathway 72. A pair of cylindrical pins 75 engage ratchet links 68. Pins 75 are rigidly affixed to a second collar 59 so that second collar 59 moves with the pins 75. Pins 75 have a diameter smaller than the width of notches 70. Pins 75 slide along pathway 72 and in and out of notches 70. Lever arm 62 manipulates ratchet links 68 so that pins 75 affixed to second collar 59 are pulled by ratchet links 68 toward first collar 57.

Tubular members 11 are placed upon a support tray 80 during the process of moving the sections of tubular members 11 relative to each other. Support tray 80 minimizes the surface contact of tubular members 11 with the ground or other physical obstacles, thus minimizing the difficulty of joining the two sections of tubular members 11, which are often quite heavy.

Figure 6:
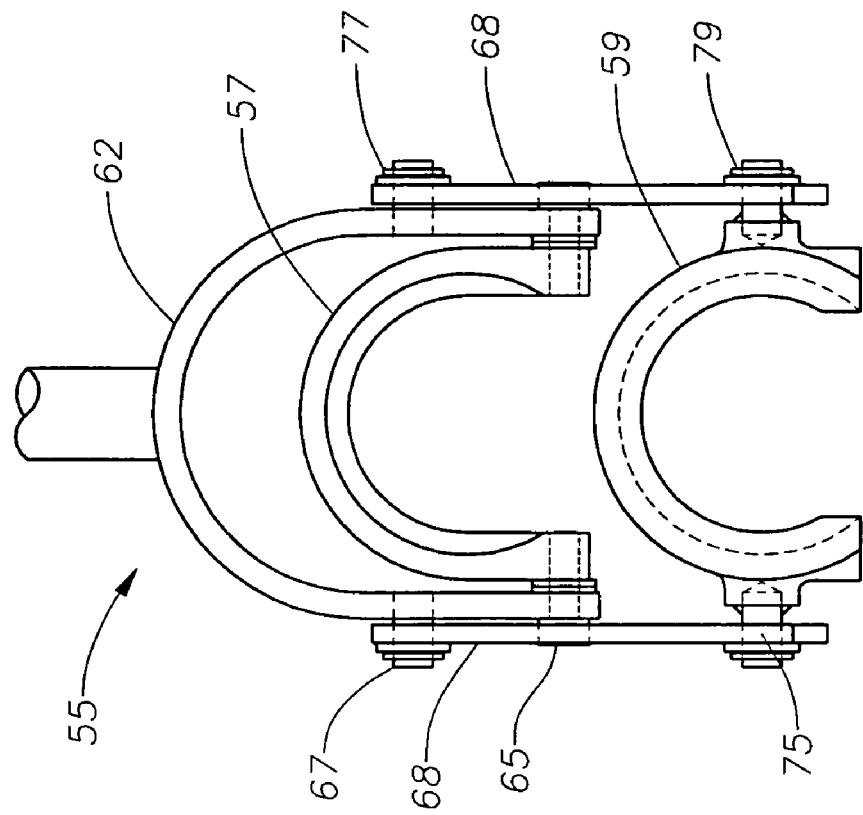
FIG. 6 is an end view of the torque arm assembly of FIG. 3.
Figure 5:
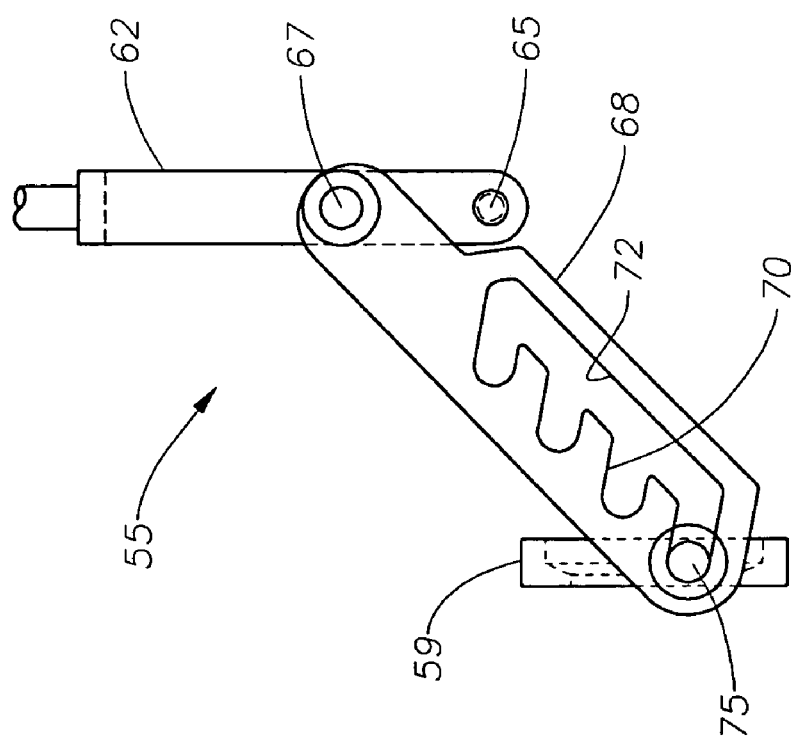
FIG. 5 is a partial sectional view of the flowline torque arm assembly of FIG. 3.

FIGS. 5 and 6 show a front view and side view, respectively, of torque arm assembly 55. Collars 57, 59 are preferably horseshoe-shaped, with an arcuate shaped opening, so that collars 57, 59 can slide over outer periphery 34. Collars 57, 59 surround a portion of tubular members 11 in a coaxial relationship with the tubular members 11. Ratchet links 68 operate on both sides of collars 57, 59 to provide for increased stability and leverage. As best shown in FIG. 6, Collars 57, 59 are on a radially inward portion of torque arm assembly 55. Lever arm 62 connects to collars 57, 59 at a location radially outward of collars 57, 59. Lever arm 62 forms an arc at the top to connect with both sides of collars 57, 59 and to connect with ratchet links 68. Ratchet links 68 extend from second collar 59 to lever arm 62 at a location just outside of lever arm 62. A set of lock washers 77, 79 are placed on the outside of pins 67 and on the outside of pins 75 to reduce the opportunity for ratchet links 68 to separate from the remaining parts of torque arm assembly 55. Pins 75 can slide in and out of notches 70 within ratchet links 68.

Figure 7:
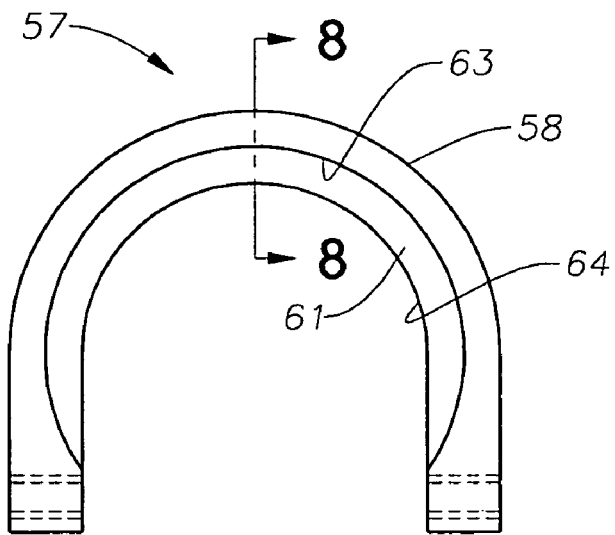
FIG. 7 is a front view of a collar of FIG. 3 in accordance with the invention.
Figure 8:
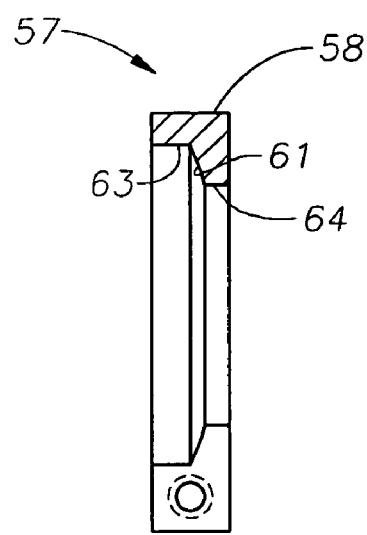
FIG. 8 is a sectional view of the collar of FIG. 7, taken along the line 8-8 of FIG. 7.

Referring to FIGS. 7-8, collar 57 has an outer surface 58. Inner surfaces of collar 57 engage outer periphery 35 of tubular members 11. Collar 57 has inner surfaces 63 and 64 with diameters substantially the same as the outer peripheries 33 and 36 of the tubular member 11 so that the inner surfaces 63, 64 engage outer peripheries 33, 36. Similarly, a tapered inner surface 61 of collar 57 is contoured to register with outer periphery 35 of tubular member 11. Although FIGS. 7-8 illustrate an embodiment of first collar 57, second collar 59 is preferably configured in a similar manner as first collar 57 but applied toward an opposite section of pipeline.

Figure 9:
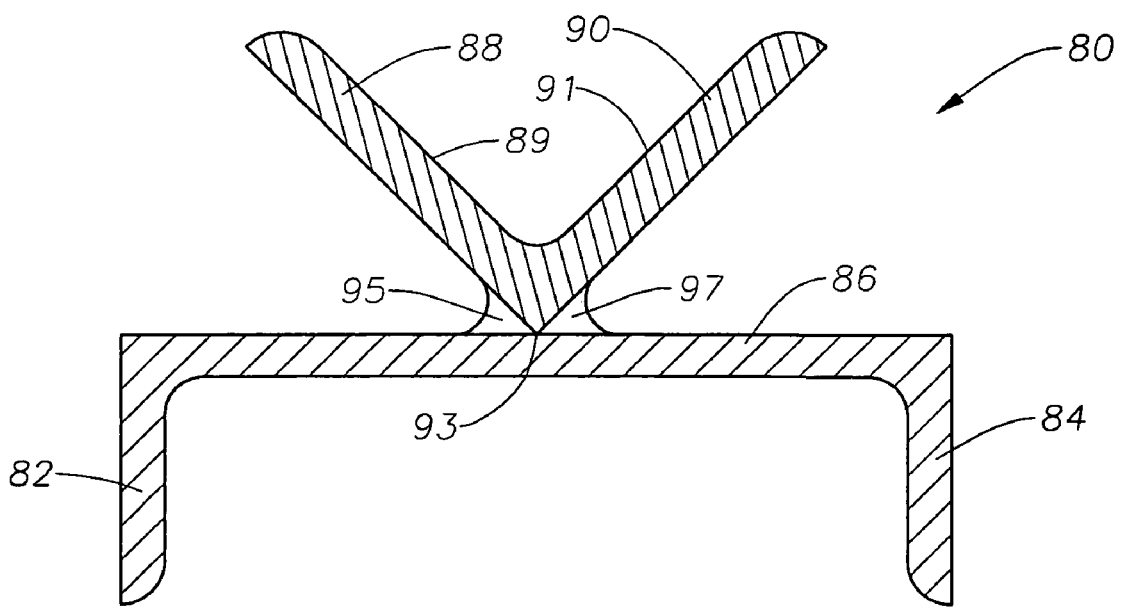
FIG. 9 is a sectional view of the tray system of FIG. 3, taken along the line 9-9 of FIG. 3.

FIG. 9 shows a sectional view of support tray 80 of FIG. 3, which is preferably made of metal or other suitable material. Support tray 80 preferably has a base assembly including a pair of legs 82, 84 and a base 86. In the embodiment shown, legs 82, 84 are substantially parallel to each other, and base 68 secures to an upper portion of each leg 82, 84, substantially perpendicular to legs 82, 84. Alternative embodiments of the legs 82, 84 and base 86, for example, can be an arcuate shape or other suitable shape. Support tray 80 also preferably has a support assembly including a pair of upwardly extending arms 88, 90. Arms 88, 90 extend upward in a "V" shape at a predetermined angle, which is 45 degrees in the preferred embodiment, but which can consist of other angles as well. Arms 88, 90 support tubular members 11 during operations in which tubular members 11 are moved relative to each other. Base 86 provides stability and support for the arms 88, 90. A fulcrum 93 of arms 88, 90 at the bottom portion of arms 88, 90 preferably contacts a mid-point of the upper side of base 86. A joint applicant 95, 97 such as, for example, a weld or other bonding agent or adhesive, is applied between each of arms 88, 90 and base 86 near fulcrum 93. Joint applicant 95, 97 is applied to an underside of arms 88, 90 and upper surface of base 86 to hold upwardly extending arms 88, 90 in position when tubular members 11 are supported thereon.

Each of the arms 88, 90 have an upward facing surface 89, 91, which contact tubular members 11 during operation of torque arm assembly 55. A surface width of upward facing surfaces 89, 91 that contact the tubular members 11 is preferably several inches and as small as possible while still providing adequate support to the load of tubular members 11. Each upward facing surface 89, 91 is preferably made of a material strong enough to support the load of tubular members 11 but with as low a coefficient of friction as possible. Alternatively, upward facing surface 89, 91 can be made of a strong material with a moderate or high coefficient of friction so long as a lubricant or grease is used that creates a low coefficient of friction when tubular members 11 traverse upward facing surface 89, 91 of arms 88, 90 as tubular members 11 are moved relative to each other.

In operation, torque applied by lever arm 62 causes ratchet links 68 to move in a direction toward first collar 57. Pins 75 affixed to second collar 59 slide within pathway 72 and engage one of notches 70. Further movement of ratchet links 68 in the direction of first collar 57 causes ratchet links 68 to pull pins 75 and second collar 59 in the direction of ratchet links 68, thereby causing second collar 59 to move toward first collar 57, and thereby causing movement of tubular members 11 relative to each other.

After lever arm 62 is pulled to its fullest extent toward first collar 57, ratchet links 68 can no longer pull second collar 59 toward first collar 57 while pins 75 of second collar 59 remain within the same notch 70 of ratchet links 68. It is therefore necessary to cause ratchet links 68 to move in such a way so that pins 75 of second collar 59 disengage one notch 70 on ratchet links 68 and engage another notch 70 on ratchet links 68 that are incrementally closer to first collar 57.

When the torque applied by lever arm 62 causes ratchet links 68 to move in an opposite direction, or in a direction away from first collar 62 in the embodiments shown, second collar 59 is held in place momentarily, and ratchet links 68 move toward second collar 59 so that pins 75 disengage from notch 70 within which they were formerly retained and return to pathway 72. After lever arm 62 has moved ratchet links 68 so that pins 75 have disengaged the former notch 70 and has moved in pathway 72 far enough to engage an adjacent notch 70, lever arm 62 is pulled in a direction toward first collar 57 thereby causing pins 75 of second collar 59 to engage the adjacent notch 70.

When pins 75 of second collar 59 engage the end portion of the adjacent notch 70, lever arm 62 is rotated toward first collar 57 to cause ratchet links 68 to pull second collar 59 toward first collar 57 until lever arm 62 is once again pulled toward first collar 57 to its fullest extent. This once rotation of lever arm 62 again causes movement of tubular members 11 relative to each other as tubular members 11.

While the invention has been shown in only one of its forms, it should be apparent to those skilled in the art that it is not so limited, but is susceptible to various changes without departing from the scope of the invention. For example, the ratchet links and the notches can be oriented so that the lever arm is used to increase the distance between the pair of collars.

The invention claimed is:

1. An assembly for moving a pair of flowline members relative to each other, comprising:
   a pair of flowline collars, each flowline collar being adapted to connect to an end portion of one of a pair of flowline members;
   an arm member having an end portion rotationally mounted to one of the flowline collars;
   a connecting member being pivotally mounted to the other flowline collar, the connecting member being pivotally mounted to the arm member a predetermined distance away from the end portion of the arm member so that rotational movement of the arm member in a first rotational direction moves the flowline members relative to each other; and
   an incremental distance adjustor assembly that maintains an incremental change in the distance between the pair of flowline collars during a rotational movement of the arm member in a second rotational direction opposite the first rotational direction.

2. The assembly for moving a pair of flowline members relative to each other of claim 1, wherein each of the pair of flowline collars have an arcuate opening to receive the end portion of the flowline members.

3. The assembly for moving a pair of flowline members relative to each other of claim 1, wherein each of the flowline collars have a first inner surface defining a first diameter and a second inner surface defining a second inner diameter, the first inner diameter being larger than the second inner diameter.

4. The assembly for moving a pair of flowline members relative to each other of claim 1, wherein the flowline collar to which the arm member is rotationally mounted further comprises an arm collar pin about which the arm member rotates.

5. The assembly for moving a pair of flowline members relative to each other of claim 1, wherein the flowline collar to which the connecting member is pivotally connected further comprises a connecting member collar pin extending though the connecting member.

6. The assembly for moving a pair of flowline members relative to each other of claim 1, wherein the connecting member further comprises an arm and connecting member pin about which the connecting member pivots relative to the arm member.

7. The assembly for moving a pair of flowline members relative to each other of claim 1, further comprising support assembly adapted to support the flowline members, the support assembly having a support base assembly and an upper assembly.

8. The assembly for moving a pair of flowline members relative to each other of claim 7, wherein the upper assembly further comprises a pair of upwardly extending support arms that extend at a predetermined angle from the support base assembly.

9. An assembly for moving a pair of flowline members relative to each other, comprising:
  a pair of flowline collars, each flowline collar being adapted to connect to an end portion of one of a pair flowline members;
  an arm member having an end portion rotationally mounted to one of the flowline collars;
  a connecting member being pivotally mounted to the other flowline collar by a connecting member collar pin, the connecting member being pivotally mounted to the arm member a predetermined distance away from the end portion of the arm member so that rotational movement of the arm member in a first direction moves the flowline members relative to each other; and
  an incremental distance adjustor assembly that maintains an incremental change in the distance between the pair of flowline collars during a rotational movement of the arm member in a second direction that is opposite from the first direction, the incremental distance adjustor assembly having an axial slot, and the connecting member collar pin engaging the axial slot when the arm member rotates in the second direction.

10. The assembly for moving a pair of flowline members relative to each other of claim 9, wherein each of the flowline collars have a first inner surface defining a first diameter and a second inner surface defining a second inner diameter, the first inner diameter being larger than the second inner diameter.

11. The assembly for moving a pair of flowline members relative to each other of claim 10, further comprising an inclined surface extending between the first and second inner surfaces, the inclined surface being adapted to engage an outer periphery of the end portion of the flowline member.

12. The assembly for moving a pair of flowline members relative to each other of claim 9, wherein the incremental distance adjustor assembly further comprises a plurality of spaced-apart transverse legs in communication with the axial slot, one of the transverse legs receiving the connecting member collar pin when the arm member rotates in the first direction.

13. The assembly for moving a pair of flowline members relative to each other of claim 12, wherein each of the transverse legs are inclined.

14. The assembly for moving a pair of flowline members relative to each other of claim 12, wherein each of the transverse legs are inclined so as to engage and pull on the connecting member pin when the arm member rotates in the first direction and to release the connecting member pin to the axial slot when the arm member rotates in the second direction.

15. A method of moving a pair of flowline members relative to each other, comprising:
  (a) providing a pair of flowline members with end portions, the end portions being spaced-apart;
  (b) connecting a flowline collar to the end portions of the pair of flowline members;
  (c) rotationally mounting an end portion of an aim member to one of the flowline collars;
  (d) pivotally mounting a connecting member to the other flowline collar;
  (e) pivotally mounting the connecting member to the arm ember a predetermined distance away from the end portion of the arm member;
  (f) rotating the arm member, thereby moving the flowline members relative to each other;
  (g) positioning an incremental distance adjustor assembly between the flowline collars; and
  (h) maintaining a distance between the flowline collars during a rotational movement of the arm member in a direction opposite from the rotation of the arm member in step (f).

* * * * *